United States Patent
Ganghofer

(10) Patent No.: US 6,504,601 B2
(45) Date of Patent: Jan. 7, 2003

(54) LASER RANGE MEASURING DEVICE FOR A FUSE

(75) Inventor: Andreas Ganghofer, Nuremberg (DE)

(73) Assignee: Diehl Munitionssysteme GmbH & Co. KG, Röthenbach (DE)

( * ) Notice: Subject to any disclaimer, the term of this patent is extended or adjusted under 35 U.S.C. 154(b) by 0 days.

(21) Appl. No.: 09/865,250

(22) Filed: May 25, 2001

(65) Prior Publication Data

US 2002/0003618 A1 Jan. 10, 2002

(30) Foreign Application Priority Data

May 27, 2000 (JP) .......................... 100 26 534

(51) Int. Cl.[7] .......................... G01C 3/08; F42C 13/02; H03K 5/22; G01S 13/08
(52) U.S. Cl. .................. 356/5.01; 102/213; 327/72; 342/134
(58) Field of Search .................. 327/72; 342/134, 342/135; 356/5.01–5.08; 102/213, 214

(56) References Cited

U.S. PATENT DOCUMENTS

| | | | | |
|---|---|---|---|---|
| 3,763,436 A | * | 10/1973 | Haw | |
| 4,722,599 A | * | 2/1988 | Fruengel et al. | |
| 4,734,587 A | * | 3/1988 | Schwarte | 250/560 |
| 4,849,644 A | * | 7/1989 | Mira et al. | 250/561 |
| 5,726,742 A | * | 3/1998 | Nourrcier | 356/5.01 |
| 5,852,491 A | * | 12/1998 | Kato | 356/5.01 |

FOREIGN PATENT DOCUMENTS

| | | |
|---|---|---|
| DE | 39 15 627 A1 | 11/1990 |
| DE | 42 24 292 C1 | 2/1994 |
| DE | 196 07 345 A1 | 8/1997 |

* cited by examiner

*Primary Examiner*—Stephen C. Buczinski
(74) *Attorney, Agent, or Firm*—Scully, Scott, Murphy & Presser

(57) ABSTRACT

A laser radar-proximity fuse with a laser-range measuring device and mask or camouflage discrimination, wherein for the initiation of the fuse, is no longer triggered at the beginning rather but at the end of an echo pulse configuration, even though its comparatively flat descending or falling pulse flank is or is not adapted for the determination of a clear, reproducible or controllable triggering point-in-time. By applying a Constant-Fraction-Trigger-Principle, which has heretofore been applied primarily to the rising or ascending flank of a pulse, there can be also derived a good controllable range or distance-dependent triggering pulse for the thereby optimized initiation of the fuse from the flatter rear flank of the echo pulse configuration, whereby the attacking of the target will not take place prematurely, but will be better directed toward the target center.

4 Claims, 1 Drawing Sheet

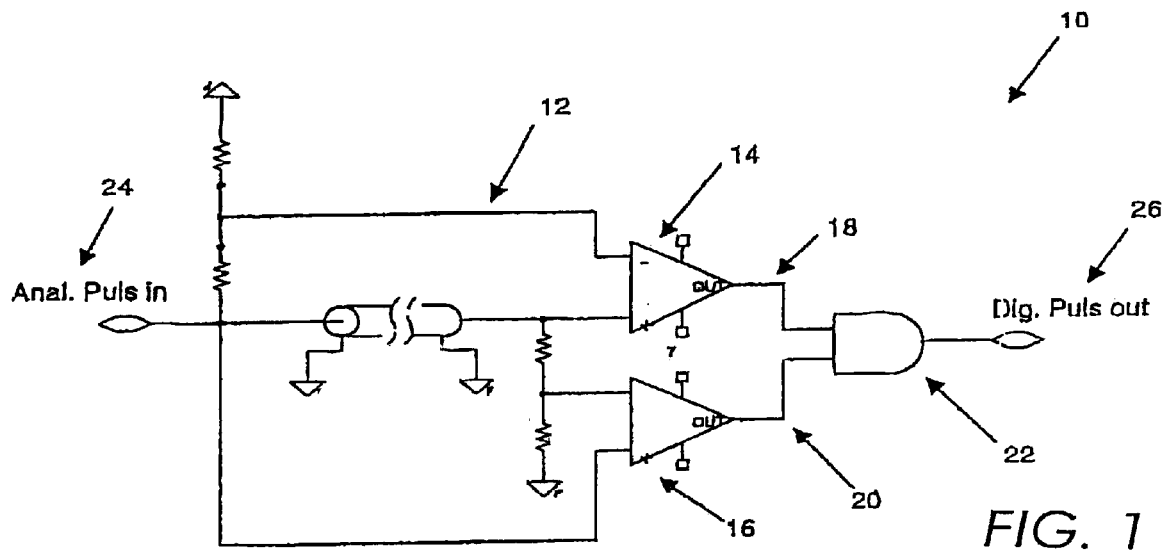
FIG. 1
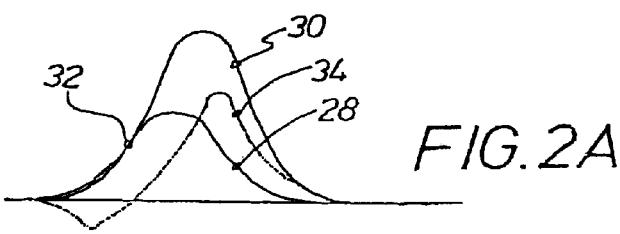
FIG. 2A
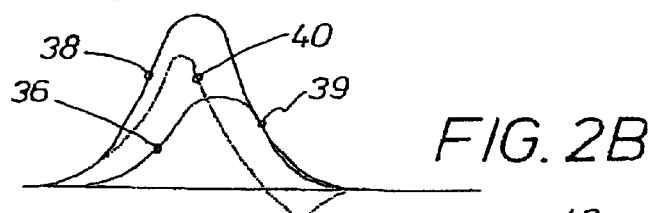
FIG. 2B
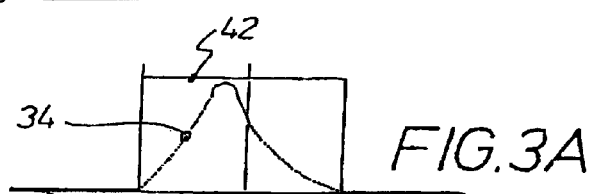
FIG. 3A
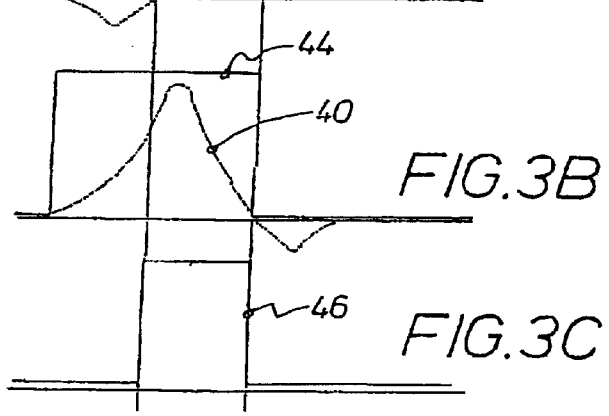
FIG. 3B
FIG. 3C

LASER RANGE MEASURING DEVICE FOR A FUSE

BACKGROUND OF THE INVENTION

1. Field of the Invention

The present invention relates to a proximity fuse, and more particularly pertains to a laser radar-proximity fuse with a laser-range measuring device and mask or camouflage discrimination.

2. Discussion of the Prior Art

A proximity fuse of that type is already known from the disclosure of German patent specification 42 24 292 C1 as an optronic fuse arrangement with discrimination between masked or camouflaged and oblique targets through the utilization of dual-gate time-of-flight pulse measuring methods. With regard to a masked target, this relates to a more or less complete covering of the target which is actually of interest such as somewhat by means of shrubbery. Due to scatter phenomena which are encountered during the reflection of the emitted laser pulse, the received echo pulse is then significantly lengthier than the transmitting pulse which is reflected at an ideal target, at a more intensely sloped ascending and a much more intensely sloped descending flank of the course of the echo pulse which is received over the period of time. A similar pulse extension is encountered at stepped targets, such as in the instance of armored vehicles and their superstructures. For a corresponding discrimination, it is known from the prior publication of this type of class, to install in the projectile fuse two mutually orthogonally oriented, each independently operating laser radar devices of presently a transmitting and a receiving station. The target discrimination is effected through a prescription of threshold values for the correlation integral from the two echo signal configurations, which necessitates a considerable additional demand an equipment to be able to distinguish the two echo signal configurations from each other and for their correlative processing.

The optical radar which is known from the disclosure of German Patent Publication DE 39 15 627 A1 avoids a mechanical oscillation of the transmitting device, in that for the line-by-line scanning of the scene there are electronically sequentially interrogated a series of receiving elements, which are beam-geometrically associated with specified transmitting elements. Pursuant to the pulse time-of-flight method, from the individual echo pulse configuration which are received in a time multiplexer, there are then produced the range or distance images which are associated with the usual reflection images. Inasmuch as the receiving echoes, in effect; the received echo pulse configuration will intensely vary due to the different ranges to the target and an object reflectivites, in the signal detector at the receiving side thereof, for the initiating of the stop or range or distance trigger, there is implemented the so-called Constant-Fraction-Trigger-Principle.

In the laser range finding device which is known from the disclosure of German Patent Publication DE 196 07 345 A1, the transmitting pulse is spatially oscillated in such a manner as to also be able to pick up a reference reflector, whose range is known extremely precisely, so that for the actual time-of-flight range finding measurement there can be obtained corrective information therefrom. Thereby in addition to the start of the echo pulse configuration, obtained is also the charge which is received with the echo pulse, or instead thereof the length of the echo pulse configuration or shape. In order to determine the pulse length there is ascertained when a reference potential which is exceeded by the steeply ascending flank is contrastingly dropped below thereof by the much flatter descending flank. The result of the measurement in any event is more representative for the reflective conditions than for the reflector range or distance, inasmuch as the slopes of the ascending flank and of the rear flank of the echo pulse configuration are more representative of the pulse amplitude, and consequently besides the range, are above all extremely dependent upon the reflective properties of the reflector. This erroneous influence is computationally eliminated by means of the reference echo from an exact previously known range, which is naturally not realizable in a laser range fuse of a projectile approaching in flight to a potential target object due to the non-constant range and aspect-dependently varying reflective conditions.

In actual practice, as a result it has heretofore been considered to be adequate in a laser proximity fuse for target range finding measurement with the measuring of the pulse time of flight up to the point-in-time at which the rising or ascending flank of the echo pulse shape or configuration exceeds a reference potential which has been specified by the circuitry. The measurement point-in-time resultingly depends not only upon the actual range or distance to the reflected target, but also upon the momentary reflective conditions from which there are significantly influenced the echo amplitude, in accordance with to which there orients itself the steepness of the echo pulse configuration or shape. The criterium which is dependent upon the ascending flank as a result does not assure an optimum point in time for the triggering of the fuse. Moreover, disadvantageous for the triggering of the fuse at the beginning of the echo pulse configuration is that for masked targets or stepped echo structures, the triggering of the fuse is not optimized against the actual target center, but against a reflective condition located in front of the actual target center, such as in the case of shrubbery in front of an armored vehicle, so that no optimized attack on a target can be expected.

SUMMARY OF THE INVENTION

In recognition of these conditions, the present invention is directed to solving the technological problem in that from the flight of the projectile there can be derived an optimization of the triggering of the fuse even against stepped or masked targets with the aid of a laser range finder or measurement device.

In accordance with a combination of the primary features of the invention, the foregoing object is achieved in that for the initiation of the fuse is no longer triggered at the beginning rather but at the end of the echo pulse configuration, even though its comparatively flat descending or falling pulse flank is or is not adapted for the determination of a clear, reproducible or controllable triggering point-in-time. By means of the per se known Constant-Fraction-Trigger-Principle, which has heretofore been applied primarily to the rising or ascending flank of a pulse, in a surprising manner, there can be also derived a good controllable range or distance dependent triggering pulse for the thereby optimized initiation of the fuse from the flatter rear flank of the echo pulse configuration, whereby the attacking of the target will not take place prematurely, but will be better directed toward the target center.

An additional optimization in the initiation of the fuse can be inventively achieved when, in combination with the triggering based on the rear flank of the pulse, there are also considered the actually applicable target reflective characteristics, for which there is characteristic an elongation of the received echo pulse in comparison with the transmitted laser pulse, somewhat in view of the varying receiving conditions during approaching flight against a target which is either fully masked by fogging or shrouding, or a target which is partially masked by a local camouflage. For these additional optimization possibilities of the fuse initiating algorithm taking place upon triggering, which itself as such is not the subject of the present invention, pursuant to a modification of the invention, there is measured the pulse length ahead of the triggering pulse which is derived from the rear pulse flank. In order to thereby be able to eliminate the influences of the momentary echo amplitude and thereby the flank steepnesses as variable error sources which are dependent upon the approach to the target, the Constant-Fraction-Trigger-Principle is thus applied to both flanks of the echo pulse configuration or time-of-flight. This is particularly advantageous from the standpoint of apparatus by means of the provision of two comparators which are interconnected at the output sides with an AND-gate, and which are actuated through a single delay element for the received echo pulse configuration. For example, the delay element is connected to the direct (meaning, to the non-inverting) input of the one comparator and the inverting input of the other comparator, at an attenuated switching-in of the undealyed echo pulse configuration to the inverting input of the first mentioned comparator and the unattenuated activation of the direct input of the other comparator. As a result thereof, at the comparator outputs for the ascending flank, or respectively for the descending flank of the echo pulse configuration, there is always produced a bipolar differential. These two voltage sequences switch on the subsequent AND-gate only then and for so long, as the two sequences concurrently carry the logical switching level of the gate (for example, both positive signal potential), so that at the gate output there is generated a rectangular pulse of a length which is characteristics for the echo pulse configuration or shape, since these are now most extensively independent of the momentary peak value of the echo pulse configuration.

BRIEF DESCRIPTION OF THE ACCOMPANYING DRAWINGS

For a more detailed elucidation of the inventive solution of the problems and its modifications and advantages, reference may now be made to the following description of an advantageous actual example of circuitry, having reference to the accompanying drawings; in which:

FIG. 1 illustrates the comparative circuit for the determination of the triggering points on the relatively steep front flank and on the significantly flatter extending rear flank of the echo pulse configuration;

FIG. 2A illustrates an example for the unattenuated delayed and the unattenuated undelayed echo pulse configuration, as well as for the bipolar timewise difference between these two pulses for determining the triggering point-in-time on the ascending pulse flank, which is independent of the peak value;

FIG. 2B, in correspondence with FIG. 2A, pertains to the determination of a triggering point-in-time on the falling or descending pulse flank from a comparison of the received echo pulse configuration with the delayed and attenuated echo pulse configuration; and FIGS. 3A through 3C represent the function of the AND-gate which is connected to the outputs of the comparators shown in FIG. 1, in dependence upon the momentary polarity of the differential configurations according to FIGS. 2A and 2B at the respective comparator output.

DETAILED DESCRIPTION OF PREFERRED EMBODIMENTS

In the laser range measurement device 10 for the optronic proximity fuse of a projectile, as illustrated in FIG. 1, a pulse input 24 delivers an echo pulse configuration prepared in an optronic receiver to a delay element 12 which activates a first comparator 14 on its non-inverting input (+), which is associated with a triggering point on the ascending pulse flank; and moreover through a voltage divider as an attenuation network, to a second comparator 16 which is associated with the triggering point on. the rear pulse flank, through its inverting input (−). Moreover, the pulse input 24 leads, but with circumventing of the delay element 12, directly to the direct input (+) of the second comparator 16, and through a voltage divider acting as an attenuating network to the inverting input (−) of the comparator 14. The outputs 18 and 20 of the two comparators 14, and respectively, 16 are connected to the two inputs of an AND-gate 22 having a pulse output 26.

The echo pulse configuration 38 which appears at the pulse input 24 thus passes as an attenuated undelayed configuration 28 to the inverting and as a delayed unattenuated pulse configuration 30 to the non-inverting input of the comparator 14, at the result of which at the inputs there accordingly acts the bipolar differential configuration 34. The change in polarity (zero passage) thereof determines the triggering point-in-time which is extensively independent from the amplitude and the pulse input 24 at the intersecting point of the two mutually timewise superimposed rising or ascending pulse flanks of the signal configurations 30 and 28 pursuant to FIG. 2A. The comparator output 18 reacts to the differential voltage 34 with the output signal 42. Correspondingly, FIG. 2B illustrates, besides the echo pulse configuration 38 at the non-inverting input of the second comparator 16 the thereby delayed and attenuated echo pulse configuration 36 at the inverting input of the second comparator 16, so that there is obtained therefrom the bipolar differential configuration 40 at the comparator output, in which again the change in polarity (zero passage) determines the triggering point-in-time 39, now at the point of intersection of the descending flanks of the pulse signal configuration 38 and 36. There is thus obtained for the output 20 the signal plot 44.

Then, and only then, when the comparator signal 42 of the front flank and the comparator signal 44 of the rear flank concurrently (here positive) carry the switching potential of the AND-logic of the gate 22, is there fulfilled the AND-requirement and as a result thereof, during that time there is delivered a rectangular pulse 46 to the gate output 26. At the steep rear flank thereof, there can be automatically triggered the fuse signal without any problem, whereby the length of the rectangular pulse 46 is characteristic for the width of the echo pulse configuration 38; in effect, for the momentary, masking-dependent target reflective conditions. In accordance with these target conditions, which are actually detected during approaching flight to the target, in a subsequent algorithm there can be resultingly optimized the initiation of the warhead in dependence upon the target and upon the type of ammunition.

What is claimed is:

1. A laser radar-proximity fuse with a laser range measurement device (10) and masking discrimination, wherein said measurement device (10) triggers a initiating triggering pulse on a descending flank of a receiving echo pulse configuration (38); said triggering pulse being initiated when a differential pulse configuration (40) from an undelayed said echo pulse configuration (38) and a delayed attenuated echo pulse configuration (36) is imparted a polarity change (zero passage).

2. A proximity fuse as claimed in claim 1, wherein there is detected a time period between triggering points-in-time on an ascending flank and said descending flank of the echo pulse configuration (38).

3. A proximity fuse as claimed in claim 2, wherein said time period is detected during the differential configuration (34; 40) from the undelayed echo pulse configuration (28; 38) and the delayed echo pulse configuration possessing the same potential.

4. A proximity fuse as claimed in claim 1 wherein said echo pulse (38) is delayedly connected to an input (+) of a first comparator (14) and additionally attenuatedly connected to an inverting input (−) of a second comparator (16), and undelayed and attenuatedly connected to the inverting input (−) of said first comparator (14) and directly to the non-inverting input (+) of said second comparator (16), said comparators (14;16) having outputs (18; 20) connected to an AND-gate (22) said AND-gate having an output (26) emitting a rectangular pulse (46) possessing a width which is representative of the length of the echo pulse configuration (38) between the triggering points (32; 39) on the ascending and on the descending flanks of said echo pulse configuration (38).

* * * * *